July 1, 1930.  F. B. STOBER  1,769,473
FOLDING SIGNAL
Filed Oct. 9, 1929   3 Sheets-Sheet 1
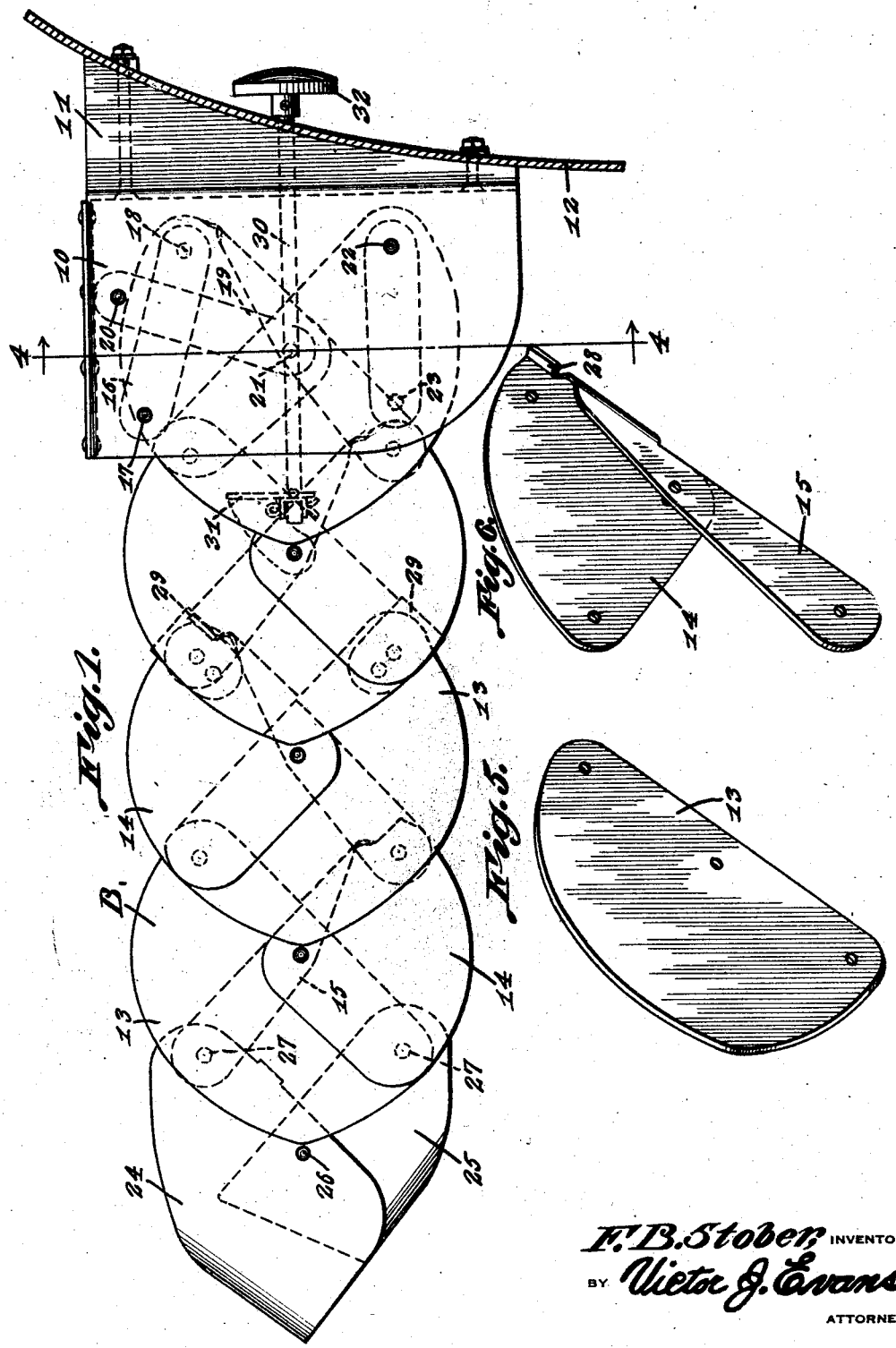

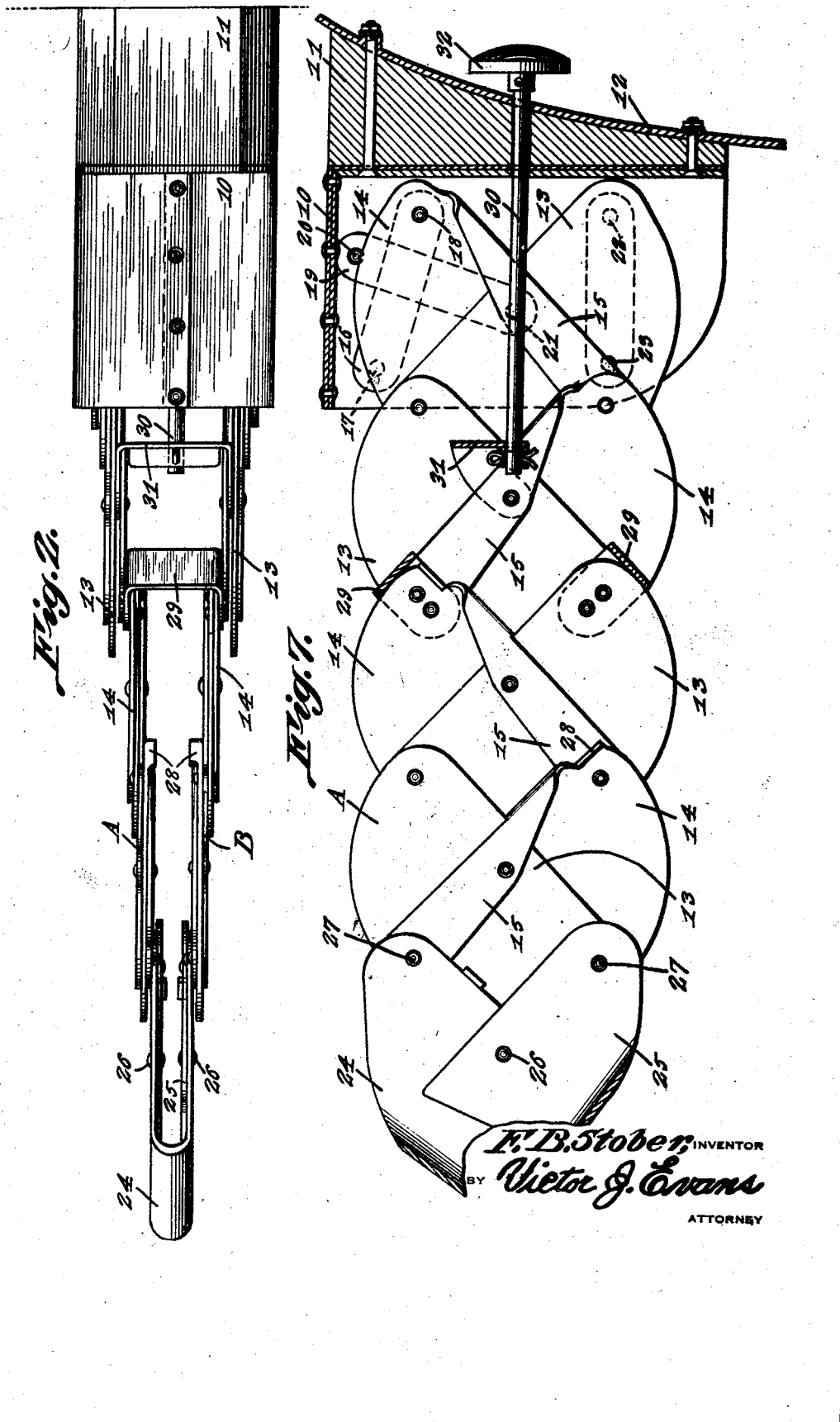

July 1, 1930.  F. B. STOBER  1,769,473
FOLDING SIGNAL
Filed Oct. 9, 1929  3 Sheets-Sheet 3
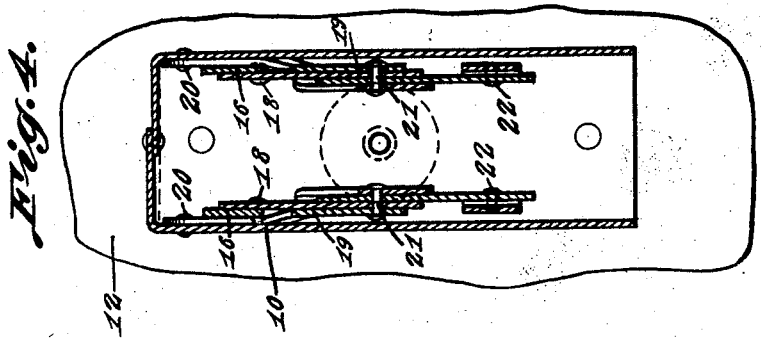
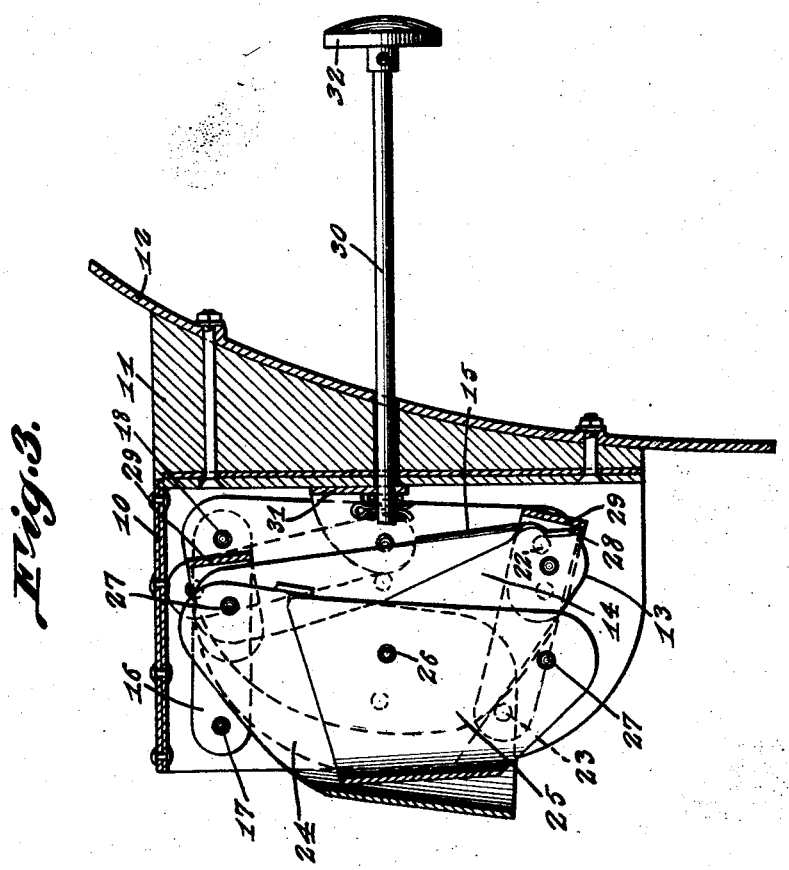
F. B. Stober, INVENTOR
BY Victor J. Evans
ATTORNEY Patented July 1, 1930

1,769,473

UNITED STATES PATENT OFFICE

FLOYD B. STOBER, OF HAYS, KANSAS

FOLDING SIGNAL

Application filed October 9, 1929. Serial No. 398,452.

The present invention relates to signals, which while primarily intended for use as an automobile signal is capable of many other analogous uses, and that its general application is contemplated by the claims.

The invention embodies a novel construction and arrangement of parts, including a signal arm capable of being folded and arranged within a housing, entirely concealed from view, and which can be quickly and easily projected therefrom for use when desired.

In carrying out the invention I contemplate a signal arm construction, capable of being folded or extended for use as the occasion may require, with said arm having an extended movement approximately three times as far as that of the operating element therefor, and requiring but little effort to actuate said arm to either its extended or folded position.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a side elevation of the invention showing the arm extended.

Figure 2 is a top plan view showing the arm extended.

Figure 3 is a sectional view through the housing showing the arm in a folded position.

Figure 4 is a sectional view on line 4—4 of Figure 1.

Figure 5 is a detail view of one of the plates used in the arm construction.

Figure 6 is a view of another one of the plates forming part of the arm.

Figure 7 is a view showing the arm extended with the housing in section.

The signal embodies a housing indicated generally at 10, one side of which is open to receive the signal arm when the latter is folded as clearly illustrated in Figure 4. This housing 10 may be constructed from any suitable material and also vary in size without departing from the invention. It may also be mounted on any suitable support, being herein illustrated on a suitable block 11 attached to an appropriate part 12 of an automobile (not shown).

The signal arm comprises spaced parallel series of pivotally connected sections, one series being indicated generally at A in Figure 2 and the other series at B. The sections of each series are constructed as illustrated in Figures 5 and 6, wherein one section is indicated at 13 and the other section at 14. These sections are alternately arranged in each series, with the corresponding sections of the respective series arranged directly opposite each other. In Figure 5 the section 13 is perfectly flat and provided with countersunk holes or openings, and preferably of the contour illustrated, while the section 14 in Figure 6 is preferably of triangular outline, and is characterized by an extension 15, folded from one edge of the section 14 and arranged at one side and parallel therewith. However, this extension is spaced from its section, and is also separated therefrom for a portion of its length adjacent the edge from which it is formed.

As above stated these sections are alternately disposed throughout the length of each series, with the innermost sections of each series being similar to that illustrated at 14 in Figure 6, these corresponding sections of the respective series being pivotally mounted upon the opposed side walls of the housing 10 by suitable links. Two of these links indicated at 16 are arranged substantially horizontally having one end pivoted as at 17 to the adjacent wall of the housing 10, while the other ends are pivoted as at 18 to the said section. Another link indicated at 19 is arranged vertically and has one end pivoted as at 20 to the adjacent wall of the housing and its other end pivoted as at 21 to the extension 15. The adjacent section 13 of each series has one end pivoted as at 22 to the adjacent link and its other end pivoted as at 23 to the adjacent corner of the next identical section 13 of the series, while the said section 13 within the housing is also pivoted at a point between its ends onto the extension 15 of the section 14 by the pivot 21. It will be observed from an inspection of Figure 7 that while the sections 13 and 14 are alternately disposed throughout the length of each series, every other section 14 is reversely disposed, that is to say that this extension 15 is arranged above or below the extension of the next corresponding section, and that the extension 15 of each section 14 is pivotally connected with the next corresponding section 14. It will be further observed that each section 13 of each series is pivoted onto the adjacent section 14 between the latter and its extension 15, while all of the sections 13 are also pivotally connected together at their adjacent corners.

In addition to the sections above described, the signal arm also includes two substantially U-shaped outer sections 24 and 25 respectively which are arranged one within the other and pivotally connected as at 26. These sections are also arranged between the series A and B and are pivotally connected as at 27 with the adjacent sections of the respective series. These two outermost sections 24 and 25 are designed to give the arm an arrow-like formation when the arm is extended for use as illustrated in Figure 1. It will be noted upon inspection of Figure 6 that the section 14 is provided with a stop lug 28 to prevent these sections from going past center when the arm is folded within the housing, while the outermost sections 24 and 25 are constructed to engage each other when the arm is folded to prevent these sections from moving past center. However the other sections 13 are not provided with any stop lug as these sections move past center when the arm is folded, and this action assists in moving the outermost sections 24 and 25 further within the housing when the arm is folded. If desired corresponding sections of the respective series may be connected together by a U-shaped bracket 29 to give the signal arm the desired strength and rigidity.

While the arm may be projected to its extended position for use, or folded within the housing in its neutral position, by any suitable means, I preferably employ an operating rod 30 which is mounted for sliding movement through the rear wall of the housing 10 and its support. The forward end of this rod is connected with a suitable bracket 31 arranged between the series A and B of said sections and connected with corresponding sections of the respective series, while the outer end of the arm is preferably provided with a knob or handle 32. With this construction the rod 30 is manually operated, although it can be operated by other mechanism if so desired without departing from the spirit of the invention. However, the construction of the signalling arm is such that it is only necessary to move the rod 30 a slight distance to quickly project the arm to its active position for use, or to retract the arm to its folded position within the housing. The construction is such, that the signalling arm will be moved approximately three times the distance of that required of the rod 30 to actuate the arm in either direction.

When the signalling arm is extended for use, it presents a complete face or surface which can carry lettering or other indicia.

While it is believed that from the foregoing description the nature and advantages of the invention will be readily apparent, I desire to have it understood, that I do not limit myself to what is herein shown and described and that such changes may be resorted to when desired as fall within the scope of what is claimed.

What I claim is:—

1. A signal of the character described comprising a housing, a signal arm comprising spaced parallel series of pivotally connected sections, an extension formed on every alternate section of each series, and arranged at one side of but in spaced relation thereto, and pivotally connected with the next corresponding section of the series, the other sections of each series being pivotally connected with the above mentioned sections between the latter and said extensions thereof, and also pivotally connected with each other, the corresponding sections of the respective series being arranged directly opposite each other, means for pivotally mounting the innermost corresponding sections of said series within the housing whereby all of said sections are capable of being folded side by side within the housing, and means for projecting said sections from the housing to form said arm.

2. A signal of the character described comprising a housing, a signal arm including spaced parallel series of pivotally connected sections, an extension formed on every alternate section of each series and arranged at one side of but in spaced relation to said section, and pivotally connected with the next corresponding section of the series, the other sections of each series being pivotally connected with the above mentioned sections between the latter and said extensions thereof, and also pivotally connected with each other, the corresponding sections of the respective series being arranged directly opposite each other, means for pivotally mounting the innermost corresponding sections of the respective series within the housing, whereby all of said sections are capable of being folded side by side within the housing, two correspondingly shaped outermost sections pivotally connected together, and with the respective series, and designed to give said arm an arrow-like formation, and means for projecting said sections from the housing to form said arm.

In testimony whereof I affix my signature.

FLOYD B. STOBER.